United States Patent
Ku

(10) Patent No.: US 6,944,749 B2
(45) Date of Patent: Sep. 13, 2005

(54) METHOD FOR QUICKLY DETERMINING LENGTH OF AN EXECUTION PACKAGE

(75) Inventor: Shan-Chyun Ku, Taipei Hsien (TW)

(73) Assignee: Faraday Technology Corp., Hsin-Chu (TW)

( * ) Notice: Subject to any disclaimer, the term of this patent is extended or adjusted under 35 U.S.C. 154(b) by 513 days.

(21) Appl. No.: 10/064,597

(22) Filed: Jul. 29, 2002

(65) Prior Publication Data

US 2004/0019767 A1 Jan. 29, 2004

(51) Int. Cl.$^7$ .............................................. G06F 9/30
(52) U.S. Cl. ..................................... 712/210; 712/212
(58) Field of Search ................................ 712/210, 212

(56) References Cited

U.S. PATENT DOCUMENTS 5,948,096 A * 9/1999 Ginosar et al. ............. 712/210
6,260,134 B1 * 7/2001 Zuraski et al. .............. 712/210
6,418,527 B1 * 7/2002 Rozenshein et al. ........ 712/208

* cited by examiner

Primary Examiner—William M. Treat
(74) Attorney, Agent, or Firm—Winston Hsu

(57) ABSTRACT

A method for decoding instructions in an execution package with a processor includes using an assembler to assemble instructions into different execution packages. Each instruction has an identification segment and an instruction segment. The method also includes using the assembler to reorder the instructions by separating identification segments from instruction segments, grouping all identification segments of the execution package together, and grouping all instruction segments of the execution package together. The method uses the processor to decode identification segments of the instructions at the same time, and adds a length of each identification segment together to calculate a total length of the execution package.

11 Claims, 6 Drawing Sheets

METHOD FOR QUICKLY DETERMINING LENGTH OF AN EXECUTION PACKAGE

BACKGROUND OF INVENTION

1. Field of the Invention

The present invention relates to a method for decoding instructions with a processor, and more specifically, to a method for decoding variable length instructions in an execution package in parallel.

2. Description of the Prior Art

Superscalar processors are becoming more and more popular in the field of computers. These processors are able to execute multiple instructions at a time in order to increase performance of the processor. A typical processor pipeline always has stages of fetch, decode, and execute. In addition, an assembler is needed to work in cooperation with the processor in order to arrange instructions in groups that can be executed in parallel. The job of the assembler is to create execution packages, which contain a number of instructions equal to or less than a degree of parallelism. The processor can then execute all of the instructions in an execution package in parallel.

Many processors use variable length instruction sets that contain instructions with a variety of different lengths. One advantage of variable length instructions is that less memory is used to store the instructions because the instructions are not longer than necessary, and do not need to conform to a single size. On the other hand, decoding these variable length instructions is a difficult task since there is no common length for each instruction, and the decoder needs to know exactly how long each instruction is in order to decode the instructions.

Please refer to FIG. 1. FIG. 1 is a block diagram of a variable length instruction 10 according to the prior art. The instruction 10 is divided into an identification segment 12 and an instruction segment 18. The identification segment 12 is further divided into a position indicator 14, which indicates whether the instruction 10 is a last instruction in an execution package, and a length indicator 16, which indicates the length of the instruction in bytes. For example, the length indicator 16 shows that the instruction 10 contains 3 bytes. The identification segment 12 is typically 4 bits or one byte long, and the instruction segment 18 contains the remaining length of the instruction 10.

Please refer to FIG. 2. FIG. 2 is a block diagram of an execution package 20 according to the prior art. The execution package contains three instructions 25, 30, 35, each of the instructions having an identical structure as that of instruction 10. As shown in identification segments 26, 32, 36, instructions 25, 30, 35 have respective lengths of 2 bytes, 4 bytes, and 3 bytes. Also, position indicators in the identification segments 26, 32 are light colored to signify that instructions 25, 30 are not last instructions in the execution package 20. On the other hand, a position indicator in the identification segment 36 is hatched to indicate that the instruction 35 is a last instruction in the execution package 20.

Please refer to FIG. 3. FIG. 3 is a flowchart of a method of assembling, fetching, and decoding variable length instructions in order to determine a total length of an execution package according to the prior art.

Step 100: Use the assembler to form groups of variable length instructions that can be executed in parallel by the processor;

Step 102: Use the assembler to pack a group of instructions into an execution package;

Step 104: Processor fetches next execution package;

Step 106:

Decode an identification segment of next instruction in the execution package; look at length indicator to determine length of instruction segment;

Step 108:

Add the length of this instruction to the total length of the current execution package;

Step 110:

Look at position indicator to determine if this is the last instruction in the execution package; if so, go to step 112; if not, go to step 106; and Step 112: The total length of the execution package has been calculated.

A shortcoming of the prior art method is efficiency of the decoding process in steps 106, 108, and 110. Specifically, the processor decodes the instruction segment of one instruction at a time. This is repeated until the lengths of all instructions in the execution package have been calculated. In other words, the lengths of instructions in an execution package are calculated in series. Thus, a great deal of time is spent calculating the lengths of instructions one at a time.

SUMMARY OF INVENTION

It is therefore a primary objective of the claimed invention to provide a method for calculating the length of an execution package in parallel in order to solve the above-mentioned problems.

A method for decoding instructions in an execution package with a processor includes using an assembler to assemble instructions into different execution packages. Each instruction has an identification segment and an instruction segment. The method also includes using the assembler to reorder the instructions by separating identification segments from instruction segments, grouping all identification segments of the execution package together, and grouping all instruction segments of the execution package together. The method uses the processor to decode identification segments of the instructions at the same time, and adds a length of each identification segment together to calculate a total length of the execution package.

It is an advantage of the claimed invention that the method decodes the identification segments within an execution package at the same time, enabling the processor to quickly calculate the total length of an execution package.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
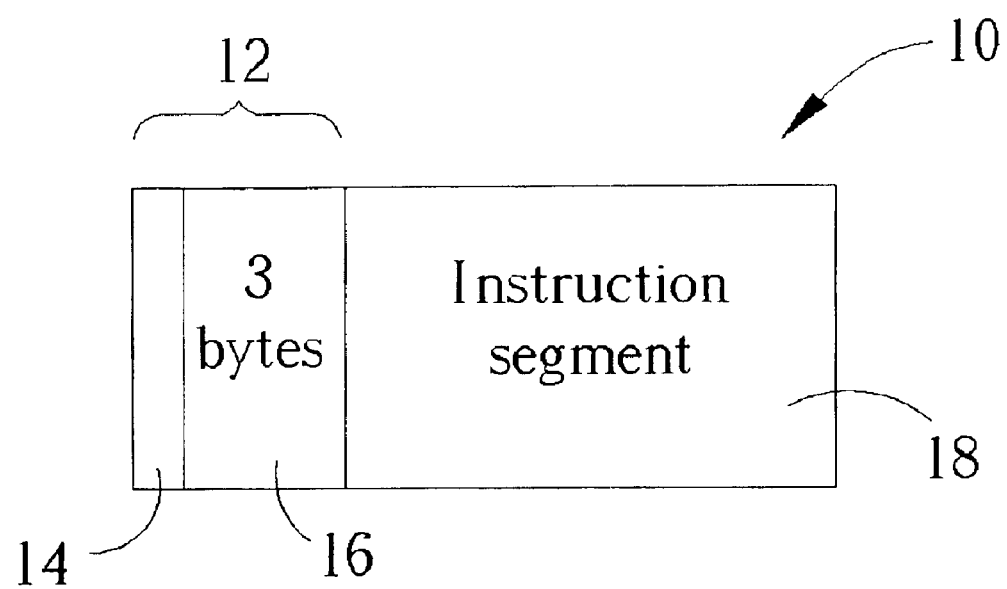
FIG. 1 is a block diagram of a variable length instruction according to the prior art.
Figure 2:
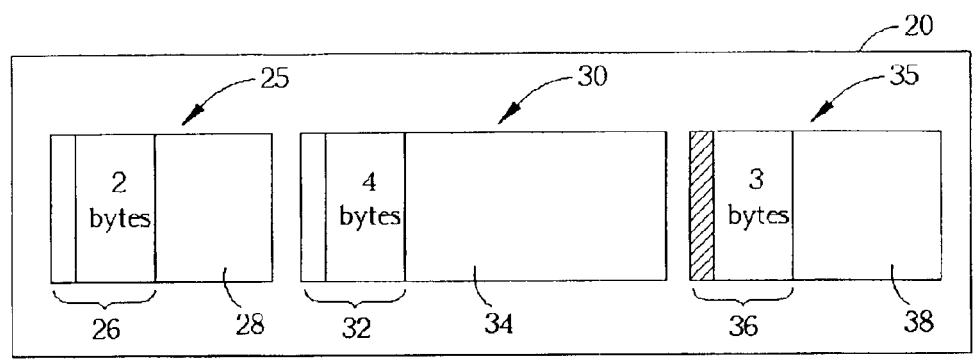
FIG. 2 is a block diagram of an execution package according to the prior art.
Figure 3:
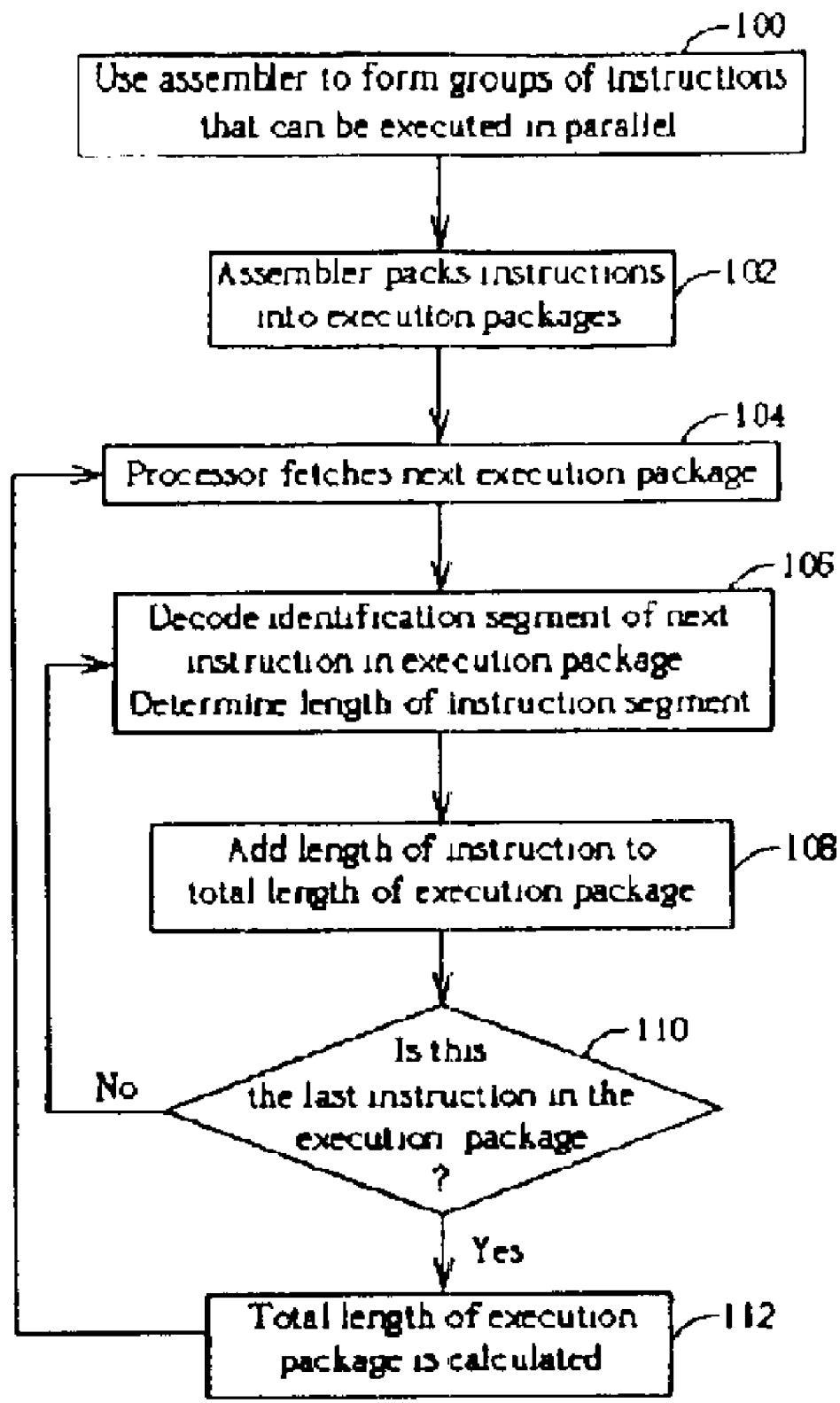
FIG. 3 is a flowchart of a method of assembling, fetching, and decoding variable length instructions in order to determine a total length of an execution package according to the prior art.

The instruction 10 and execution package 20 shown in FIG. 1 and FIG. 2 are identical to those used in the present invention. In fact, the only difference between the present invention and the prior art is in a method for using a processor (such as a CPU or a DSP) to decode instructions.

Figure 4:
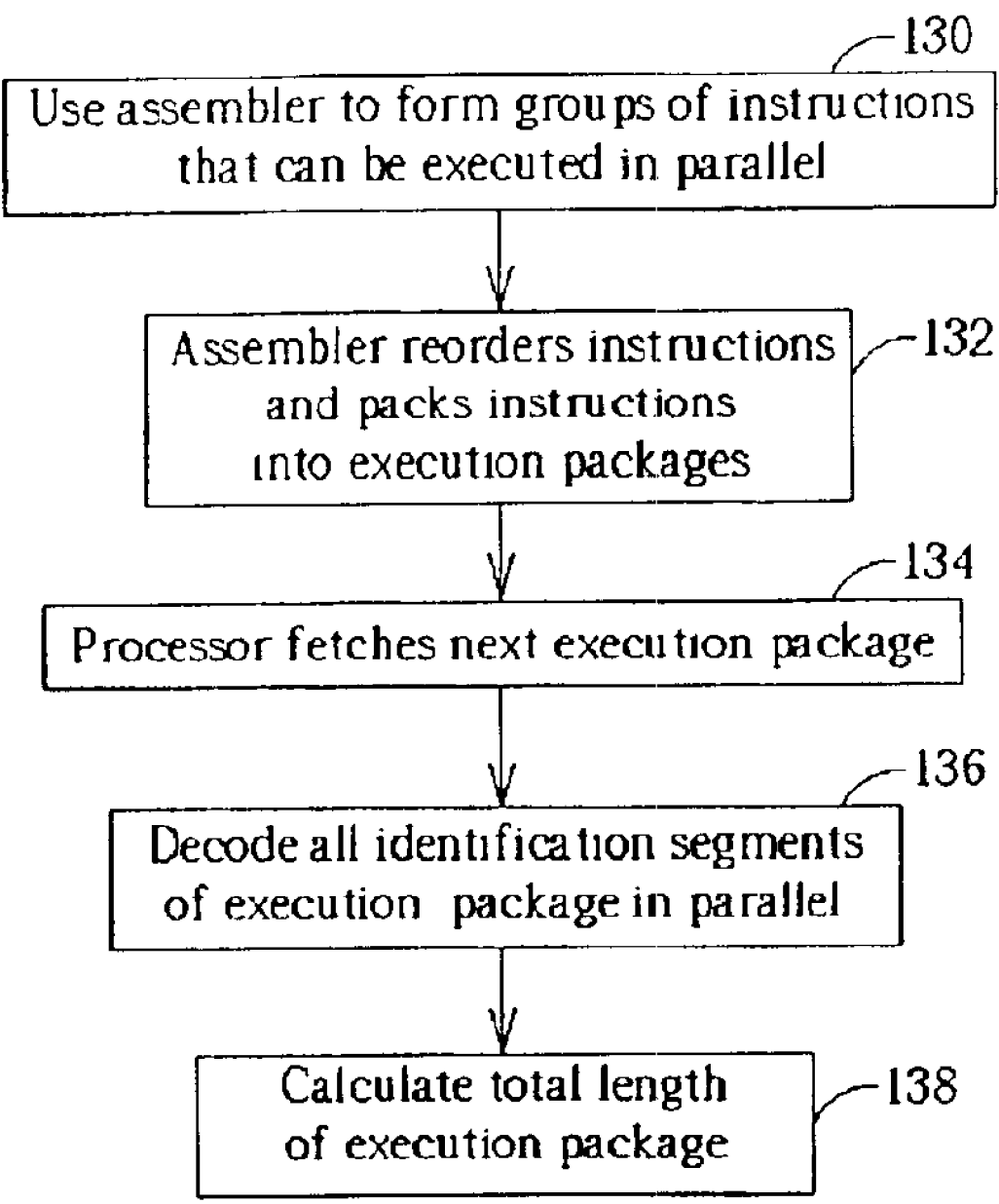
FIG. 4 is a flowchart of a method of assembling, fetching, and decoding variable length instructions in order to determine a total length of an execution package according to the present invention.

Please refer to FIG. 4. FIG. 4 is a flowchart of a method of assembling, fetching, and decoding variable length instructions in order to determine a total length of an execution package according to the present invention.

Step 130:

Use the assembler to form groups of variable length instructions that can be executed in parallel by the processor;

Step 132:

Use the assembler to reorder instructions and to pack a group of instructions into an execution package; all identification segments in the execution package are grouped together and all instruction segments in the execution package are grouped together;

Step 134: Processor fetches next execution package;

Step 136: Decode all identification segments of the execution package in parallel; and Step 138: Calculate total length of execution package;

The key difference between the prior art method of decoding variable length instructions and the present invention method is that the present invention can decode all identification segments in an execution package in parallel. On the other hand, the prior art decoded each identification segment in series. Clearly, by using parallel decoding for decoding identification segments, the present invention allows the processor to save considerable time in determining the total length of an execution package.

Figure 5:
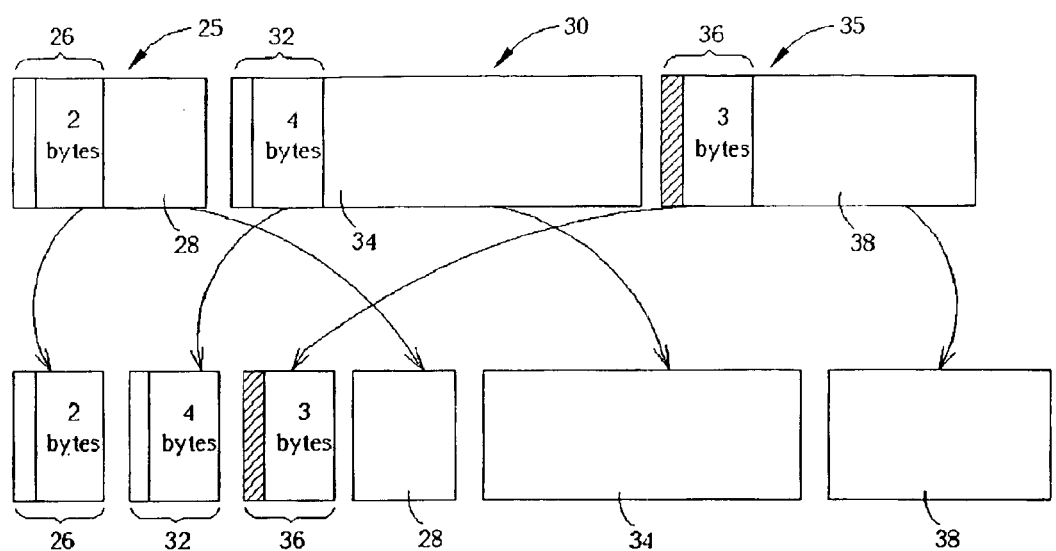
FIG. 5 illustrates the use of an assembler to reorder instructions in an execution package according to the present invention.

Please refer to FIG. 5. FIG. 5 illustrates the use of the assembler to reorder instructions in an execution package. FIG. 5 is essentially an illustration of step 132 of the flow chart shown in FIG. 4. In the top half of FIG. 5, instructions 25, 30, 35 are in original form. That is identification segments 26, 32, 36 are grouped with their respective instruction segments 28, 34, 38. After the assembler reorders the instructions 25, 30, 35, the result is shown in the bottom half of FIG. 5. That is, all identification segments 26, 32, 36 are grouped together, and all instruction segments 28, 34, 38 are grouped together separate from the identification segments 26, 32, 36.

Figure 6:
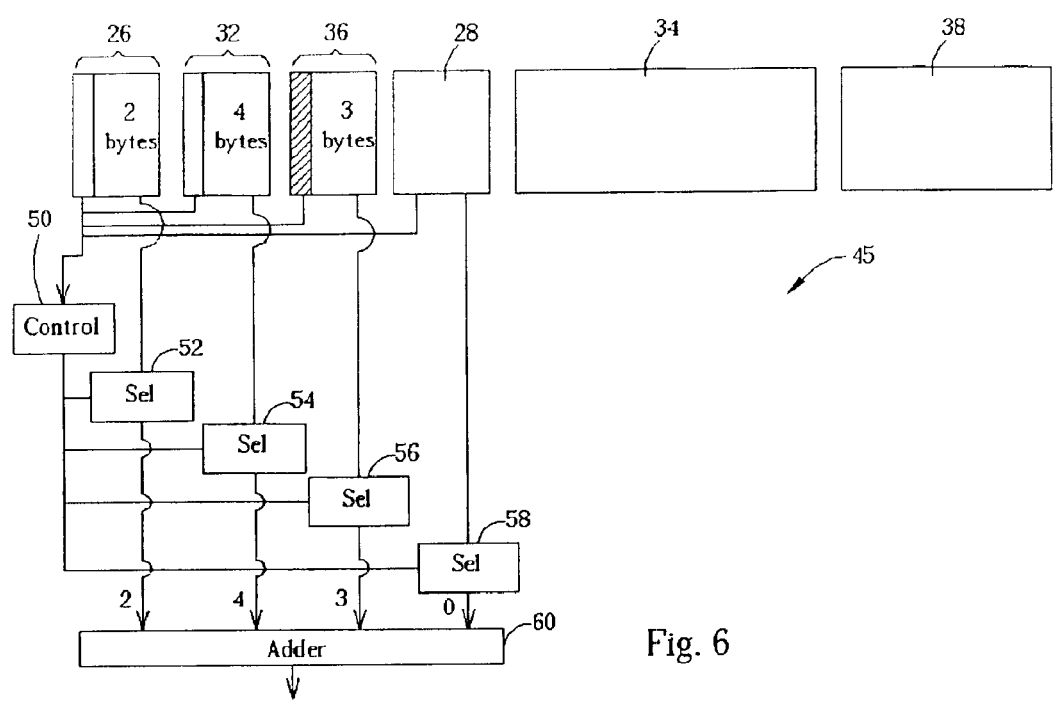
FIG. 6 illustrates calculating the total length of an execution package according to the present invention.

Please refer to FIG. 6. FIG. 6 illustrates calculating the total length of an execution package according to the present invention. In other words, FIG. 6 illustrates steps 136 and 138 of the flow chart shown in FIG. 4. As mentioned above, the maximum number of instructions that the processor can execute in parallel limits the number of instructions that can be packed into an execution package. For the following example, assume the processor can execute up to four instructions in parallel. Notice, however, that the execution package 20 shown in FIG. 2 only has three instructions 25, 30, 35.

A length-calculating module 45 is used to calculate the total length of the execution package 20. For the following explanation, assume the identification segments 26, 32, 36 are each one byte long. Since identification segments are always grouped before instruction segments in reordered execution packages, the length-calculating module 45 will presume that four instructions are present in the execution package, and will read the first four bytes of the reordered execution package 20. Therefore, the first three bytes read are the identification segments 26, 32, 36. The fourth byte read belongs to the instruction segment 28. Next, a control circuit 50 of the length-calculating module 45 reads the position indicators (if any) of the first four bytes in the reordered execution package 20. The control circuit 50 reads the position indicator of identification segment 36, and detects that the identification segment 36 corresponds to a last instruction in the execution package 20. Thus, the fourth byte, which is the instruction segment 28, is not used in calculating a total length of the execution package 20 since it is not an identification segment.

The control circuit 50 controls selector cells 52, 54, 56, 58 to read the length indictors (if any) of the first four bytes in the reordered execution package 20. If the control circuit 50 recognized a position indicator in an identification segment, then a corresponding selector cell is controlled to output a length read from the corresponding length indicator to an adder 60. Thus, as shown in FIG. 6, the adder 60 receives length values of 2, 4, 3, 0, respectively, from the first four bytes of the execution package. This means that the total length of the execution package 20 is 2+4+3+0=9 bytes.

As shown above, the present invention method allows the processor to decode all identification segments within an execution package in parallel. Thus, a great deal of time is saved by calculating a total length of an execution package in parallel. The above examples assumed the processor could execute a maximum of four instructions in parallel, however the scope of the present invention covers all processors or digital signal processors that are able to execute any number of instructions in parallel.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for decoding instructions in an execution package with a processor, each instruction comprising an identification segment and an instruction segment, the method comprising:

using an assembler to assemble instructions into different execution packages;

using the assembler to reorder the instructions by separating identification segments from instruction segments, grouping all identification segments of the execution package together, and grouping all instruction segments of the execution package together; and using the processor to decode identification segments of the instructions at the same time.

2. The method of claim 1 wherein the identification segments include data specifying lengths of corresponding instruction segments.

3. The method of claim 2 wherein each identification segment includes information to indicate whether an instruction corresponding to the identification segment is a last instruction in the execution package.

4. The method of claim 3 wherein a length of each identification segment is added together to calculate a total length of the execution package.

5. The method of claim 1 wherein number of instructions in an execution package is less or equal to number of instructions that the processor can execute at the same time.

6. The method of claim 1 wherein the instructions are variable length instructions.

7. The method of claim 1 wherein the processor is a digital signal processor (DSP).

8. A method for decoding instructions in an execution package with a processor, each instruction comprising an identification segment and an instruction segment, the method comprising:

using an assembler to assemble instructions into different execution packages;

using the assembler to reorder the instructions by separating identification segments from instruction segments, grouping all identification segments of the execution package together, and grouping all instruction segments of the execution package together;

using the processor to decode identification segments of the instructions at the same time; and adding a length of each identification segment together to calculate a total length of the execution package.

9. The method of claim 8 wherein the instructions are variable length instructions.

10. The method of claim 8 wherein number of instructions in an execution package is less or equal to number of instructions that the processor can execute at the same time.

11. The method of claim 8 wherein the processor is a digital signal processor (DSP).

* * * * *